United States Patent [19]

Moore et al.

[11] Patent Number: 4,988,531
[45] Date of Patent: Jan. 29, 1991

[54] METHOD FOR MANUFACTURING GEL PIECES

[75] Inventors: Carl O. Moore, Rochester; James R. Dial, Moweaqua, both of Ill.

[73] Assignee: A. E. Staley Manufacturing Company, Decatur, Ill.

[21] Appl. No.: 432,448

[22] Filed: Nov. 7, 1989

[51] Int. Cl.$^5$ .................................................. A23L 1/05
[52] U.S. Cl. ...................................... 426/578; 426/573; 426/660; 426/661
[58] Field of Search ............... 426/572, 573, 578, 579, 426/660, 661, 658, 103

[56] References Cited

U.S. PATENT DOCUMENTS

| | | | |
|---|---|---|---|
| 3,218,177 | 11/1965 | Robinson et al. | 426/578 |
| 3,883,365 | 5/1975 | Forsberg et al. | 127/60 |
| 3,892,871 | 7/1975 | Cooper | 426/576 |
| 3,928,062 | 12/1975 | Yamauchi | 127/60 |
| 4,199,374 | 4/1980 | Dwivedi et al. | 127/60 |
| 4,225,627 | 9/1980 | Moore | 426/548 |
| 4,379,171 | 4/1983 | Furda et al. | 426/103 |
| 4,517,021 | 5/1985 | Schollmeier | 127/30 |
| 4,643,773 | 2/1987 | Day | 127/30 |

OTHER PUBLICATIONS

B. W. Minifie, *Chocolate, Cocoa and Confectionery: Science and Technology*, pp. 309–391, 433–442, and 481–483 (AVI Publ. Co., Westport, Conn., 2d ed., 1980).

H. M. Pancoast et al., *Handbook of Sugars*, pp. 176–177 and 232–233 (AVI Publ. Co., Westport, Conn., 2d ed., 1980).

"Crystalline Fructose: A Breakthrough in Corn Sweetener Process Technology", *Food Technology*, Jan. 1987, pp. 66–67 and 72.

*Primary Examiner*—Donald E. Czaja
*Assistant Examiner*—Anthony Weier
*Attorney, Agent, or Firm*—Michael F. Campbell; J. Daniel Wood

[57] ABSTRACT

A method of manufacturing gel pieces is provided. The gel pieces are prepared from a cooked mixture comprising a thin-boiling starch as a gelling agent and a sweetener system comprising a high fructose corn syrup and a crystalline sweetener comprised of fructose. The cooked mixture is deposited in a plurality of molds and allowed to set to yield gel pieces which can then be packaged in bulk. The use of high fructose corn syrup and a crystalline fructose sweetener yields gel pieces which have excellent resistance to adhesion to hard surface molds and/or one another when packaged in bulk even over a long period of time at elevated storage temperatures.

10 Claims, No Drawings

METHOD FOR MANUFACTURING GEL PIECES

FIELD OF THE INVENTION

This invention relates to methods useful in the manufacture of formed gel pieces derived from aqueous starch slurries, particularly formed gel confection pieces.

BACKGROUND OF THE INVENTION

Gel confections such as imitation fruit pieces, fruit bars, jellybean centers, and sugared jellies have been prepared with sugar (e.g., 42 and/or 64 D.E. corn syrups), water, and starch for many years. These confections have a firm, but soft, texture which contributes to their desirable mouthfeel. The gel confections are typically manufactured by a starch mold casting process known in the trade as the Mogul system. In this process, the ingredients are cooked at a temperature above the boiling point of the mixture and/or at a moisture level above that of the finished confection for a sufficient length of time to fully activate, or gelatinize, the starch. In a typical pressure cooking process for a commercial Mogul system, the ingredients are cooked at a moisture level of about 20 to 25 weight percent at a temperature of about 140° to 170° C. for less than about 1 minute. The starch is generally an acid-thinned (also known as thin-boiling) common corn starch or a high amylose starch or a blend thereof. After cooking, the hot liquid mixture is deposited into a starch mold. The starch mold forms the confection and helps to reduce the moisture content. The deposited confections are then routinely dried for about 24 to 72 hours to reach the desired moisture content of about 14 to 20 weight percent.

B. W. Minifie, *Chocolate, Cocoa and Confectionery: Science and Technology*, pp. 390–391, 433–442, and 481–483 (AVI Publ. Co., Westport, Conn., 1980, 2d ed.), discloses processes and recipes for various confections, including starch jellies in the form of sugar sanded jellies, jujubes, and jellybean centers. The use of thin-boiling starch alone or with high amylose starch is disclosed along with corn syrup. Specific recipes (e.g., page 439) disclose the use of 64 D.E. corn syrup, but the use of high fructose syrup or fructose in sugar confectionery in general is also disclosed (pp. 481–482).

SUMMARY OF THE INVENTION

This invention relates to a method of preparing a gel confection comprising:

obtaining a high solids, cooked mixture comprising an amount of a thin-boiling common starch effective to form a gel and a sweetener system comprising a high fructose corn syrup and a crystalline sweetener comprised of fructose, depositing said cooked mixture into a plurality of molds wherein said cooked mixture is allowed to set to form a plurality of gel pieces, and packaging said plurality of gel pieces together in bulk, wherein the cumulative concentration of high fructose corn syrup and crystalline sweetener is sufficiently high to provide resistance of said gel pieces to adhesion in said bulk packaging.

This invention also relates to a method of preparing a gel confection comprising:

obtaining a high solids, cooked mixture comprising an amount of a thin-boiling common starch effective to form a gel and a sweetener system comprising a high fructose corn syrup and a crystalline sweetener comprised of fructose, depositing said cooked mixture into a plurality of hard surface molds wherein said cooked mixture is allowed to set to form a plurality of gel pieces, wherein the cumulative concentration of said high fructose corn syrup and said crystalline sweetener are sufficiently high to provide resistance to adhesion of said gel pieces to said molds.

DETAILED DESCRIPTION OF THE INVENTION

The first step in preparing a gel confection is obtaining a high solids, cooked mixture of a particular starch. Any type of thin-boiling starch capable of thickening to a gel is acceptable, but thin-boiling common starches are preferred. Common starches are known in the art to be conventional genetic varieties as opposed to unconventional genetic varieties having unconventional traits, e.g., waxy corn starch (essentially amylopectin) and high amylose corn starch. Thin-boiling starches are also known in the art as starches which have been treated to reduce their viscosity when cooked.

Acid-thinned corn starches are preferred because of their particular gel strength and reduced hot viscosity, but other thin-boiling starches may be used. An especially preferred acid-thinned common corn starch is MIRA-SET® 285 corn starch, a commercial product of the A. E. Staley Manufacturing Company, which exhibits gel strengths markedly superior to a conventional acid-thinned starch of equal fluidity. Other suitable starches include modified (i.e., no chemical modification) and modified (e.g., substituted, cross-linked, thin-boiling, and oxidized) common tapioca and common potato starches. Non-gelling starches can also be blended with the thin-boiling starch to provide other characteristics, e.g., thickening during processing.

The high solids, cooked mixture will contain water. The water mixed with the starch fluidizes the mixture, provides moisture to the gel and is necessary for the hydration of the starch upon cooking. The water may be added separately and/or as part of another ingredient, e.g., as in a corn syrup and/or a fruit juice. The amount of water in the mixture should be substantially equal to that desired in the final gel. If volatilization of water from the slurry prior to forming is anticipated (e.g., as a result of preheating of the slurry), such volatilization should be taken into account in determining the amount of water used in the slurry to retain the amount desired in the gel.

The mixture will also contain a sweetener system comprising a high fructose corn syrup and a crystalline sweetener comprised of fructose. Of course, crystalline fructose is very soluble in water and so will not exist in crystalline form in the high solids, cooked mixture, but is present as a crystalline solid prior to mixing with the mixture. By "high fructose corn syrup" (HFCS) is meant a corn syrup containing at least about 40% fructose by weight of dry solids (d.s.), typically from about 40% to about 60% (e.g., the two most common HFCS are at a nominal 42% or 55% d.s. fructose).

High fructose corn syrups are items of commerce as disclosed by H. M. Pancoast et al., *Handbook of Sugars*, pp. 176–177 and 232–233. The Type A high fructose corn syrup referred to therein and having 42% d.s. fructose is the product of enzymatic isomerization of a glucose syrup that generally has from 5–8% higher saccharides (e.g., di-saccharides, tri-saccharides, and so on). The Type B high fructose syrup contains 55% d.s. fructose and is typically obtained by chromatographic fractionation of a Type A syrup, but can be obtained by other means of fructose enrichment of a Type A syrup (e.g., crystallization of dextrose from a Type A syrup).

Crystalline fructose is also an item of commerce, but has historically been much less plentiful than corn syrups. The crystallization of fructose is disclosed in U.S. Pat. Nos. 3,883,365 (Forsberg et al.), 3,928,062 (Yamauchi), 4,199,374 (Dwivedi et al.), and 4,643,773 (Day). Crystalline fructose is to be distinguished from materials containing significant amounts of amorphous fructose or corn syrup by-products, e.g., the semi-crystalline fructose disclosed in U.S. Pat. No. 4,517,021 (Schollmeier). Crystalline fructose is available commercially at a purity in excess of 99.0% as the anhydrous crystalline form of $\beta$-D-fructose, for example KRYSTAR ® brand crystalline fructose available from A. E. Staley Manufacturing Company. The amount of fructose as a percentage by weight of the saccharides of the entire sweetener system will generally be at least about 42%, and preferably from about 55% to about 60%.

In addition to crystalline fructose, the sweetener system may also contain crystalline dextrose. Crystalline dextrose is available commercially in the anhydrous or monohydrate crystalline form, the latter being preferred. The crystalline fructose and crystalline dextrose can be mixed with the syrup separately or premixed together before mixing with the syrup. However, the percent (d.s.b.) of dextrose in the sweetener system must generally be no more than 40% (preferably no more than 35%) to prevent crystallization thereof in the gel piece.

Without wishing to be bound by any theory (unless expressly noted otherwise), it is thought that the small amount of higher saccharides in high fructose corn syrup and the substantial absence of the same in crystalline fructose (and crystalline dextrose) is responsible for the preparation of gel pieces that have reduced adhesion (i.e., to each other and/or to a bulk package) upon bulk storage, as well as excellent gel strength after setting. In other words, it is thought that the concentration of higher saccharides from any corn syrups in the sweetener system must be sufficiently low to minimize the effect of the adhesive qualities of such saccharides on the gel piece surface. Typically, the sweetener system will be substantially free of conventional corn syrups and will consist essentially of high fructose corn syrup and crystalline fructose and, thus, higher saccharides will comprise less than about 8% by weight of the saccharides of the sweetener system on a dry solids basis, and more typically less than about 3%.

The thin-boiling starch of the mixture is gelatinized generally by cooking. Preferred mixtures contain "cook-up" starches which are gelatinized during a cooking period after mixing with the sweetener system and prior to deposition in molds. Cooking under atmospheric pressure in a heated vessel will simultaneously fully hydrate the starch and remove excess moisture. Pressure cooking can also be used, particularly when it is desired to retain substantially all of the water in the mixture. In any event, the method of cooking should not allow significant amounts of air or other gases to be reintroduced into a deaerated mixture. Additives, such as colorants, flavors (e.g., natural and/or imitation fruit flavors and/or juices), and the like are commonly added after cooking and before deposition.

The high solids, cooked mixture is deposited into a plurality of molds where it is allowed to set. The bulk mixture, still in a fluid phase, is divided among a number of molds. The molds can be of any construction suitable for the intended purpose. Starch molds can be employed. Starch molds are formed by making a plurality of depressions of the desired shape in a bed of starch. The molds are filled with the high solids, cooked mixture which is then allowed to set to gel pieces.

In preferred embodiments, the mixture is deposited into a plurality of hard surface molds. Hard surface is meant to include metal (e.g., steel, brass, etc.) and plastic molds. Other examples include rubber, wood, porcelain and the like. It has been found that the gel pieces demold easily from the hard surface molds. The pieces can be removed from the hard surface molds by conventional means (e.g., air injection through an aperture in the mold). Alternatively, plastic molds can be simply covered to form a package for transport and handling of gel pieces. Molds and demolding are discussed in U.S. Pat. No. 4,225,627 (Moore), the disclosure of which is incorporated herein by reference.

The time required to set will depend upon the particular formulation chosen, but will generally be about 24 hours for starch molding and about 12 minutes for hard surface molding. The temperature of the mixture during the setting period may vary, but with starch molds is preferably kept at an elevated temperature (e.g., 60° C.) by placement of the fitted molds in an oven.

After the mixture has set to form gel pieces, the gel pieces can be demolded, glazed, and packaged in bulk. By "in bulk", it is meant that the gel pieces are packaged together in a manner which allows the surfaces of individual gel pieces to come into contact, i.e., each gel piece is not individually wrapped. The precise number of gel pieces in a given bulk package may, of course, vary widely. Typically, however, the gel pieces will be packed in cartons for bulk shipment at 30 pounds per carton for sale at wholesale. For retail sale, the gel pieces may be repacked in bulk in the form of 10-100 bit-sized pieces packed in a plastic bag or 50-500 in a can or jar. The gel pieces can be tightly packed for an extended period of time (e.g., for a month or more) and/or at elevated temperatures (e.g., 50° C.) and yet will not significantly adhere to each other. This facilitates removal of the pieces upon opening of the bulk package preparatory to consumption or other use.

The following examples will illustrate the invention, but should not be construed to limit the invention unless otherwise expressly noted. Those skilled in the art will understand that variations of the same may be made within the scope and spirit of the invention. In this specification and claims, all parts, percentages, ratios and the like are by weight unless otherwise indicated in context.

EXAMPLES

Example 1

The following ingredients are mixed together:

| Ingredient | Parts by Weight |
| --- | --- |
| Thin-boiling common corn starch (MIRA-SET ® 285 A. E. Staley Mfg. Co.) | 800 |
| High Fructose Corn Syrup (42% fructose, 71% dry solids, | 2900 |

-continued

| Ingredient | Parts by Weight |
|---|---|
| ISOSWEET ® 100, A. E. Staley Mfg. Co.) Crystalline Fructose (KRYSTAR ®, A. E. Staley Mfg. Co.) | 1900 |
| Crystalline Dextrose Monohydrate (STALEYDEX ® 333, A. E. Staley Mfg. Co.) | 896.6 |
| Water (tap) | 854.2 |
| | 7350.8 |

The resulting mixture was preheated to 200° F. and jet cooked at 290° F. in a ¾" jet cooker for just less than about 1 minute. To 7000 parts by weight of the freshly cooked mixture were added the following ingredients:

| Ingredient | Parts by Weight |
|---|---|
| Cherry Juice Concentrate (65° Brix) | 510 |
| Malic Acid | 25 |
| Cherry Flavor (liquid, #81-861 from Alex Fries Co.) | 75 |

The resulting mixture was deposited into dry starch molds and held in an oven at 60° C. for 24 hours. The resulting gel pieces were de-molded and coated lightly with a glazing oil (e.g., at 120–150 g per 100 kg of gel pieces. One-half pound of coated gel pieces were sealed in a glass quart jar which was then stored for 30 days in an oven kept at about 50° C. Upon opening of the jar, the pieces exhibited substantially no adhesion to one another and fell freely from the open jar upon inversion thereof.

Example 2

The following ingredients were mixed together:

| Ingredient | Parts by Weight |
|---|---|
| Thin-boiling common corn starch (MIRA-SET ® 285, A. E. Staley Mfg. Co.) | 3875 |
| Crystalline Fructose (KRYSTAR ®, A. E. Staley Mfg. Co.) | 4500 |
| High Fructose Corn Syrup (ISOSWEET ® 180, A. E. Staley Mfg. Co.) | 21250 |
| Water (tap) | 1625 |

The resulting mixture was preheated to 200° F. and jet cooked at 300° F. in a ¾" jet cooker for just less than about 1 minute. The cooked mixture was then deposited in brass molds and allowed to set at room temperature for 12 minutes. The pieces popped out of the brass molds nicely at the end of the 12 minute period.

Example 3

The procedure of Example 2 was repeated, except that the additional water (1625 parts by weight) was omitted. The pieces also demolded nicely.

What is claimed is:

1. A method of preparing a gel confection comprising:
   obtaining a high solids, cooked mixture comprising an amount of a thin-boiling common starch effective to form a gel and a sweetener system comprising a high fructose corn syrup and a crystalline sweetener comprised of fructose, wherein said fructose in said crystalline sweetener comprised of fructose does not exist in crystalline form in said high solids, cooked mixture,
   depositing said cooked mixture into a plurality of molds wherein said cooked mixture is allowed to set to form a plurality of gel pieces, and
   packaging said plurality of gel pieces together in bulk, wherein the cumulative concentration of high fructose corn syrup and crystalline sweetener is sufficiently high to provide resistance of said gel pieces to adhesion in said bulk packaging.

2. A method of claim 1 wherein said sweetener system is substantially free of higher saccharides.

3. A method of claim 1 wherein said sweetener system has less than 8% higher saccharides by weight of dry solids.

4. A method of claim 1 wherein said sweetener system consists essentially of said high fructose corn syrup and crystalline fructose.

5. A method of claim 1 wherein the dextrose in said sweetener system is less than 40% by weight of dry solids of the sweetener system.

6. A method of preparing a gel confection comprising:
   obtaining a high solids, cooked mixture comprising an amount of a thin-boiling common starch effective to form a gel and a sweetener system comprising a high fructose corn syrup and a crystalline sweetener comprised of fructose, wherein said fructose in said crystalline sweetener comprised of fructose does not exist in crystalline form in said high solids, cooked mixture,
   depositing said cooked mixture into a plurality of hard surface molds wherein said cooked mixture is allowed to set to form a plurality of gel pieces, wherein the cumulative concentration of said high fructose corn syrup and said crystalline sweetener are sufficiently high to provide resistance to adhesion of said gel pieces to said molds.

7. A method of claim 6 wherein said sweetener system is substantially free of higher saccharides.

8. A method of claim 6 wherein said sweetener system has less than 8% higher saccharides by weight of dry solids.

9. A method of claim 6 wherein said sweetener system consists essentially of said high fructose corn syrup and crystalline fructose.

10. A method of claim 6 wherein the dextrose in said sweetener system is less than 40% by weight of dry solids of the sweetener system.

* * * * *